(12) United States Patent
Kon

(10) Patent No.: US 9,356,538 B2
(45) Date of Patent: May 31, 2016

(54) MULTIAXIAL DRIVING APPARATUS

(71) Applicant: Mitsubishi Electric Corporation, Tokyo (JP)

(72) Inventor: Takayuki Kon, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/759,250

(22) PCT Filed: Apr. 9, 2013

(86) PCT No.: PCT/JP2013/060715
§ 371 (c)(1),
(2) Date: Jul. 6, 2015

(87) PCT Pub. No.: WO2014/167648
PCT Pub. Date: Oct. 16, 2014

(65) Prior Publication Data
US 2015/0349674 A1    Dec. 3, 2015

(51) Int. Cl.
*H02P 1/54* (2006.01)
*H02M 7/797* (2006.01)
*H02P 27/04* (2016.01)
*H02P 5/74* (2006.01)
*H02P 3/14* (2006.01)

(52) U.S. Cl.
CPC ............. *H02M 7/797* (2013.01); *H02P 3/14* (2013.01); *H02P 5/74* (2013.01); *H02P 27/04* (2013.01)

(58) Field of Classification Search
CPC ............ H02M 3/1582; B60L 11/1868; B60L 2210/12; B60L 2210/14; B60L 2240/423; Y02T 10/7005; Y02T 10/6239; Y02T 10/7275; B60K 6/445
See application file for complete search history.

(56) References Cited

U.S. PATENT DOCUMENTS

| 7,868,569 | B2 | 1/2011 | Iwashita et al. |
| 8,040,097 | B2 | 10/2011 | Iwashita et al. |
| 8,096,377 | B2 | 1/2012 | Sato |
| 8,410,744 | B2 | 4/2013 | Iwashita et al. |

(Continued)

FOREIGN PATENT DOCUMENTS

| CN | 101611540 A | 12/2009 |
| JP | 61-267675 A | 11/1986 |

(Continued)

OTHER PUBLICATIONS

International Search Report for PCT/JP2013/060715 dated Jun. 25, 2013.

(Continued)

*Primary Examiner* — Shawki S Ismail
*Assistant Examiner* — Zoheb Imtiaz
(74) *Attorney, Agent, or Firm* — Sughrue Mion, PLLC; Richard C. Turner

(57) ABSTRACT

A part of bus-voltage smoothing capacitors within a multi-axial driving apparatus is usable as a power-assisting electric storage device for storing regenerative power. This makes it unnecessary to additionally provide a power-assisting electric storage device, which has been required in order to obtain a power-assist function. Therefore, the multiaxial driving apparatus can be obtained, which is equipped with the power-assist function of achieving effective use of regenerative power easily at low cost without resulting in an increase in complexity and high cost.

5 Claims, 3 Drawing Sheets

(56) References Cited

U.S. PATENT DOCUMENTS

| | | | |
|---|---|---|---|
| 9,260,003 B2 * | 2/2016 | Matsushita | B60K 6/442 |
| 2006/0038524 A1 | 2/2006 | Okamoto et al. | |
| 2012/0019174 A1 * | 1/2012 | Mahlein | B60L 11/1803 |
| | | | 318/139 |
| 2013/0073125 A1 * | 3/2013 | Araki | B60L 7/14 |
| | | | 701/19 |
| 2013/0113279 A1 | 5/2013 | Hatanaka | |
| 2014/0292076 A1 * | 10/2014 | Nakamura | B60L 7/16 |
| | | | 307/10.1 |
| 2015/0229252 A1 * | 8/2015 | Toba | H02M 7/5387 |
| | | | 318/400.27 |

FOREIGN PATENT DOCUMENTS

| | | |
|---|---|---|
| JP | 10-155298 A | 6/1998 |
| JP | 10-164862 A | 6/1998 |
| JP | 2012-085535 A | 4/2002 |
| JP | 2004-260890 A | 9/2004 |
| JP | 2005-057846 A | 3/2005 |
| JP | 2006-060935 A | 3/2006 |
| JP | 4339916 B2 | 10/2009 |
| JP | 2010-081679 A | 4/2010 |
| JP | 2011-101456 A | 5/2011 |
| JP | 2011-101457 A | 5/2011 |
| JP | 2011-213422 A | 10/2011 |
| JP | 2012-085509 A | 4/2012 |
| JP | 2012-085535 A | 4/2012 |
| JP | 2012-196143 A | 10/2012 |
| JP | 2013-009476 A | 1/2013 |
| JP | 2013-021760 A | 1/2013 |

OTHER PUBLICATIONS

Taiwanese Office Action for TW102139041 dated Dec. 11, 2014.

* cited by examiner

MULTIAXIAL DRIVING APPARATUS

CROSS REFERENCE TO RELATED APPLICATIONS

This application is a National Stage of International Application No. PCT/JP2013/060715 filed Apr. 9, 2013, the contents of all of which are incorporated herein by reference in their entirety.

FIELD

The present invention relates to a multiaxial driving apparatus that includes a plurality of inverter circuits provided in parallel to an output terminal of a single converter circuit, and that is used to drive a plurality of motors individually, and more particularly relates to a multiaxial driving apparatus that is suitable for achieving effective use of regenerative power.

BACKGROUND

A motor driving apparatus that is used to control driving of a motor includes a converter circuit that converts a commercial AC power supply to a DC power supply, a bus-voltage smoothing capacitor that smooths an output DC voltage of the converter circuit to generate a stable bus voltage, and an inverter circuit that carries out switching of the bus voltage generated by the bus-voltage smoothing capacitor in order to generate a driving AC power supply having an arbitrary frequency and voltage to be supplied to the motor.

The inverter circuit is configured by connecting a predetermined number of semiconductor switching elements such as IGBTs in a series-parallel combination in a bridge configuration between positive and negative bus-bars that are connected to both terminals of the bus-voltage smoothing capacitor. A freewheeling diode is connected to each of the semiconductor switching elements in inverse parallel. Specifically, an inverter circuit for a three-phase motor is described as an example. The inverter circuit has a configuration in which three sets of two semiconductor switching elements connected in series are provided in parallel between a positive bus-bar and a negative bus-bar, and three-phase output terminals are configured by three upper-lower-arm connection ends between three upper-arm semiconductor switching elements and three lower-arm semiconductor switching elements.

Meanwhile, a motor, in which its driving is controlled by this motor driving apparatus, performs a power consuming operation (a power running operation), and a power regenerating operation (a regenerative operation) based on a relation between a rotational speed of the motor and a synchronous speed determined by a frequency of driving power supplied from the inverter circuit. For example, a motor used in a crane facility performs a power running operation at the time of hoisting, and performs a regenerative operation at the time of lowering. In the motor driving apparatus, when regenerative power generated by the motor during its operation is input to an output terminal of the inverter circuit, the bus voltage rises. When the bus voltage rises excessively, a protecting circuit is activated, and the motor operation is stopped.

Therefore, in order that regenerative power generated by a motor can be effectively used as motor driving power (which is referred to as "power assist" in this specification), a configuration has been proposed in, for example, Patent Literature 1, in which a buck-boost chopper circuit is provided in parallel to a bus-voltage smoothing capacitor, and a power-assisting electric storage device is provided, in which its charge and discharge is controlled by this buck-boost chopper circuit.

Specifically, the buck-boost chopper circuit has a configuration, in which a series circuit of two semiconductor switching elements such as IGBTs is connected between positive and negative bus-bars (that is, between both terminals of the bus-voltage smoothing capacitor), where a freewheeling diode is connected to each of the semiconductor switching elements in inverse parallel, and a reactor is provided between a connection end between these two semiconductor switching elements and a positive terminal of the power-assisting electric storage device. A negative terminal of the power-assisting electric storage device is connected to the negative bus-bar.

In this buck-boost chopper circuit, a step-down operation is performed by the semiconductor switching element on the positive bus-bar and the reactor, and a boost operation is performed by the semiconductor switching element on the negative bus-bar and the reactor.

This configuration is described using the example in which a motor is used in a crane facility. When regenerative power, generated by the motor at the time of lowering the crane, flows into the inverter circuit, the semiconductor switching element on the positive bus-bar in the buck-boost chopper circuit is first turned on to operate as a buck chopper circuit in order to supply and store, power by an increase in the bus voltage due to the regenerative power, to and in the power-assisting electric storage device. In this state, when the semiconductor switching element on the positive bus-bar is turned off, and simultaneously, the semiconductor switching element on the negative bus-bar, which is a boost chopper circuit element, is turned on, then a discharge current from the power-assisting electric storage device flows through the reactor to the semiconductor switching element on the negative bus-bar. Energy biasing the current to flow in one direction is stored in the reactor.

Therefore, when the semiconductor switching element on the negative bus-bar, through which the discharge current is flowing, is turned off, the current-urging energy stored in the reactor causes the discharge current from the power-assisting electric storage device to be supplied to the positive terminal of the bus-voltage smoothing capacitor through the freewheeling diode connected in inverse parallel to the turned-off semiconductor switching element on the positive bus-bar. Accordingly, the bus-voltage smoothing capacitor is charged. The voltage of this bus-voltage smoothing capacitor is supplied to the inverter circuit, and is then used for motor driving power at the time of a power running operation of the motor.

According to the technique proposed in Patent Literature 1 as described above, regenerative power generated by the motor can be effectively used as motor driving power. Therefore, it is possible to obtain a more energy-efficient motor driving apparatus.

There has been a known motor driving apparatus with a configuration in which, in order to individually drive a plurality of motors incorporated in a numerical-control machine tool or an industrial machine, for example, a plurality of inverter circuits are provided in parallel to an output terminal of a single converter circuit. This motor driving apparatus is referred to as "multiaxial driving apparatus" in this specification for convenience of explanation.

When the technique proposed in Patent Literature 1 is applied to the multiaxial driving apparatus as described above, it is necessary to provide a power-assisting electric storage device and a buck-boost chopper circuit. This results in a problem that the size of the entire apparatus increases, and the number of maintenance parts increases.

In Patent Literature 2, for example, a technique has been disclosed to this problem, in which in order to downsize the entire apparatus, and reduce the number of maintenance parts, a semiconductor switching element in an inverter circuit is also used as a semiconductor switching element in a buck-boost chopper circuit.

That is, in Patent Literature 2, an inverter control circuit and a charge-discharge chopper control circuit are provided. The inverter control circuit controls switching elements in the inverter circuit to cause the inverter circuit to perform an inverter operation to drive the motor. The charge-discharge chopper control circuit controls the switching elements in the inverter circuit to cause the inverter circuit to charge and discharge the power-assisting electric storage device. Outputs of both the control circuits are connected to a control terminal of the inverter circuit through a selector switch. The inverter circuit connects at its output terminal to the motor and to one end of a reactor through selector switches. A positive terminal of the power-assisting electric storage device is connected to the other end of the reactor.

In the technique disclosed in Patent Literature 2, due to this configuration, each of the selector switches is given a control switching signal to switch between a function of the inverter control circuit that is to cause the semiconductor switching elements within the inverter circuit to drive the motor, and a function of the charge-discharge chopper control circuit that is to cause the semiconductor switching elements within the inverter circuit to charge and discharge the power-assisting electric storage device.

For another example, in Patent Literature 3, a technique has been disclosed in which a propulsion driving apparatus is used to charge a power-assisting electric storage device.

According to the techniques disclosed in Patent Literatures 2 and 3, the driving apparatus can cause the inverter circuit to perform an inverter operation and a charge-discharge operation. Therefore, the shared use as the semiconductor switching element in the inverter circuit and as the semiconductor switching element in the buck-boost chopper circuit can be achieved.

CITATION LIST

Patent Literatures

Patent Literature 1: Japanese Patent Application Laid-open No. H10-164862
Patent Literature 2: Japanese Patent Application Laid-open No. 2011-101456
Patent Literature 3: Japanese Patent Application Laid-open No. 2012-85535

SUMMARY

Technical Problem

However, according to the technique disclosed in Patent Literature 2, in the multiaxial driving apparatus, the inverter control circuit and the charge-discharge chopper control circuit are provided, and many selector switches that rely on an electrical signal are needed. Therefore, downsizing of the apparatus cannot be achieved, which means a tendency of high cost and an increase in complexity.

Further, it is necessary to provide the power-assisting electric storage device, and therefore the multiaxial driving apparatus cannot be downsized by the volume of the power-assisting electric storage device.

In a power-assist control, regenerative power is stored in the power-assisting electric storage device, and then the stored regenerative power is charged into a bus-voltage smoothing capacitor, and thus used to drive the motor. In order to execute the power-assist control by internally generating a command without the need for a command from a higher controller, it is necessary to prepare means for collecting power information within the driving apparatus, an external current sensor that measures motor power, or other devices. This results in a more-complicated and high-cost multiaxial driving apparatus.

The present invention has been achieved to solve the above problems, and an object of the present invention is to provide a multiaxial driving apparatus that is equipped with a power-assist function of achieving effective use of regenerative power easily at low cost without resulting in an increase in complexity and high cost.

Solution to Problem

To solve the above problems and achieve the object, a multiaxial driving apparatus according to the present invention includes: a converter circuit that converts an AC power supply to a DC power supply; a plurality of inverter circuits that are provided in parallel between positive and negative bus-bars that are connected respectively to positive and negative output terminals of the converter circuit, and each of the inverter circuits is configured by connecting a predetermined number of semiconductor switching elements in a series-parallel combination in a bridge configuration; a plurality of bus-voltage smoothing capacitors that are provided in parallel between the positive and negative bus-bars in a one-to-one relation with the respective inverter circuits; and a control unit that controls an operation of the inverter circuits individually under a program control. A switching device that does not rely on an electrical signal, and a reactor are provided, and one end of the switching device is connected to an output terminal of at least one inverter circuit, to which a motor is not connected, among the inverter circuits, and the other end of the switching device is connected to the reactor. A positive terminal of the bus-voltage smoothing capacitor for one inverter circuit, to which the reactor is connected, is disconnected from the positive bus-bar, and is connected to a switching base terminal in the switching device, one switching terminal in the switching device is connected to the other end of the reactor, and the other switching terminal in the switching device is connected to the positive bus-bar. In the switching device, when the switching base terminal and the one switching terminal are connected through a conductor, and the switching base terminal and the other switching terminal are not connected, a predetermined number of inverter circuits, to which the motor is connected, receive a motor-control command from the control unit, and then respectively use the predetermined number of semiconductor switching elements connected in a series-parallel combination in a bridge configuration to generate AC power with an arbitrary frequency and voltage, to be supplied to the motor, from a bus voltage generated by the corresponding bus-voltage smoothing capacitors. One inverter circuit, to which the reactor is connected, receives a power-assist command from the control unit, and then the predetermined number of semiconductor switching elements connected in a series-parallel combination in a bridge configuration operate as a buck-boost switching device to store power by an increase in the bus voltage in a bus-voltage smoothing capacitor for the one inverter circuit, and the bus-voltage smoothing capacitor is connected at its positive terminal to the switching base terminal in the switching device.

Advantageous Effects of Invention

According to the present invention, a part of bus-voltage smoothing capacitors within the multiaxial driving apparatus is usable as a power-assisting electric storage device for storing regenerative power. This makes it unnecessary to additionally provide a power-assisting electric storage device, which has been required in order to obtain a power-assist function. Therefore, the multiaxial driving apparatus can be obtained, which is equipped with the power-assist function of achieving effective use of regenerative power easily at low cost without resulting in an increase in complexity and high cost.

DESCRIPTION OF EMBODIMENTS

Exemplary embodiments of a multiaxial driving apparatus according to the present invention will be explained below in detail with reference to the accompanying drawings. The present invention is not limited to the embodiments.

First Embodiment

Figure 1:
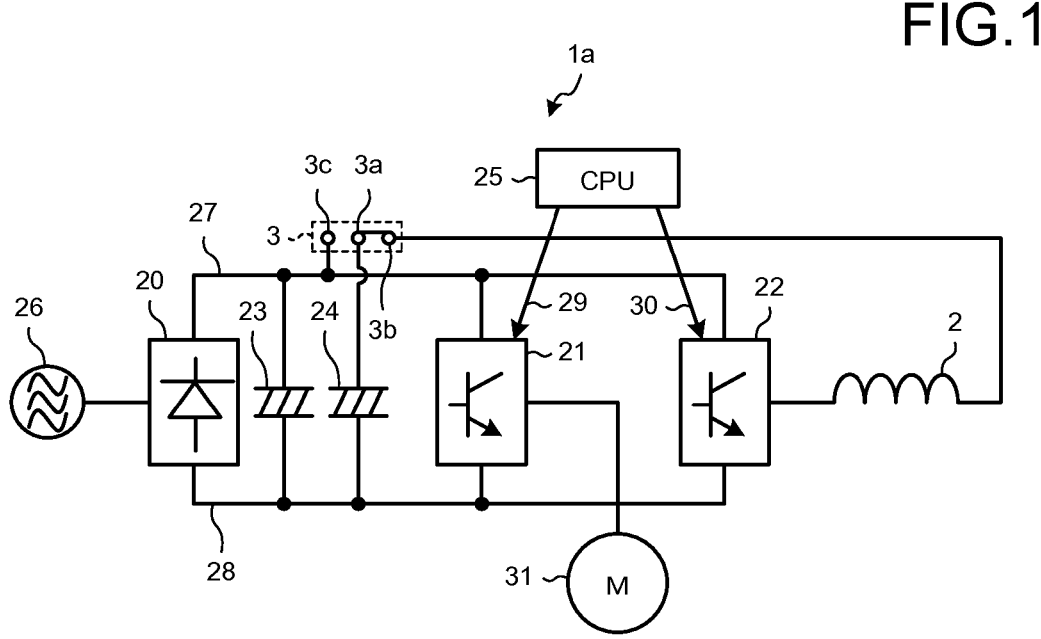
FIG. 1 is a block diagram illustrating a configuration of a multiaxial driving apparatus according to a first embodiment of the present invention.

FIG. 1 is a block diagram illustrating a configuration of a multiaxial driving apparatus according to a first embodiment of the present invention. In the first embodiment of the present invention and other five embodiments described later, an example of application to a multiaxial driving apparatus that is configured to drive two motors is described for the sake of easy understanding.

First, for the sake of easy understanding, the multiaxial driving apparatus that is configured to drive two motors is briefly described with reference to FIG. 1. That is, in FIG. 1, the multiaxial driving apparatus that is configured to drive two motors generally includes a converter circuit 20, inverter circuits 21 and 22, bus-voltage smoothing capacitors 23 and 24, and a control unit 25.

The converter circuit 20 is a full-wave rectifying circuit configured by a diode bridge, and converts a commercial AC power supply 26 to a DC power supply. The inverter circuits 21 and 22 are provided in parallel between a positive bus-bar 27 and a negative bus-bar 28. The positive bus-bar 27 and the negative bus-bar 28 are connected respectively to positive and negative output terminals of the converter circuit 20. The bus-voltage smoothing capacitors 23 and 24 are provided between the positive bus-bar 27 and the negative bus-bar 28 for the purpose of smoothing and stabilizing a bus voltage.

The control unit 25 is configured by a microcomputer (CPU), and outputs operation commands 29 and 30 that are motor-control commands individually to the inverter circuits 21 and 22 under the program control.

Each of the inverter circuits 21 and 22 is configured by connecting a predetermined number of semiconductor switching elements in a series-parallel combination in a bridge configuration between the positive bus-bar 27 and the negative bus-bar 28. The semiconductor switching element is an IGBT, for example. A freewheeling diode is connected to the semiconductor switching element in inverse parallel. An inverter circuit for a three-phase motor is described as an example. The inverter circuit has a configuration in which three sets of two semiconductor switching elements connected in series are provided in parallel between the positive bus-bar 27 and the negative bus-bar 28, and three-phase output terminals are configured by three upper-lower-arm connection ends between three upper-arm semiconductor switching elements and three lower-arm semiconductor switching elements.

In a multiaxial driving apparatus 1a according to the first embodiment of the present invention, a reactor 2 and a switching device 3 that does not rely on an electrical signal are added to the general multiaxial driving apparatus described above. Additionally, the control unit 25 has an additional function of generating a "power-assist command" for achieving effective use of regenerative power as the operation commands 29 and 30 in addition to a motor-control command.

The switching device 3 is configured by a terminal block, a connector, and a conductor. Connection switching for connecting a switching base terminal 3a with one switching terminal 3b or with the other switching terminal 3c is manually performed.

One end of the reactor 2 is connected to an output terminal of at least one inverter circuit, to which a motor is not connected (that is, an inverter circuit not in use), among a plurality of inverter circuits. In the example illustrated in FIG. 1, the inverter circuit 21 is in use because a motor 31 is connected to its output terminal, while the inverter circuit 22 is not in use. In this case, one end of an added reactor 2 is connected to the output terminal of the inverter circuit 22 to which the motor 31 is not connected. The other end of the reactor 2 is connected to one switching terminal 3b in an added switching device 3.

A positive terminal of the bus-voltage smoothing capacitor 24 for the inverter circuit 22, to which a motor 31 is not connected, is disconnected from the positive bus-bar 27, and is connected to the switching base terminal 3a in the switching device 3. The other switching terminal 3c in the switching device 3 is connected to the positive bus-bar 27.

The control unit 25 is notified of information regarding the inverter circuit 21 in use, to which the motor 31 is connected, and regarding the inverter circuit 22, to which the reactor 2 is connected, among the inverter circuits. Based on this information, the control unit 25 generates and outputs the operation commands 29 and 30.

That is, the control unit 25 gives the inverter circuit 21 (an inverter circuit in use, to which a motor is connected) the operation command 29 that is a motor-control command, and gives the inverter circuit 22 (an inverter circuit, to which the reactor 2 is connected, among inverter circuits that are not in use) the operation command 30 that is a power-assist command.

Next, an operation of a multiaxial driving apparatus 1a of a portion related to the first embodiment will be described. As illustrated in FIG. 1, when the switching base terminal 3a and one switching terminal 3b in the switching device 3 are connected through the conductor, the inverter circuit 21 receives a motor-control command as the operation command 29, and then uses a predetermined number of semiconductor switching elements, connected in a series-parallel combination in a bridge configuration, to generate AC power with an arbitrary frequency and voltage, to be supplied to the motor 31, from a bus voltage generated and stabilized by the bus-voltage smoothing capacitor 23.

Meanwhile, the inverter circuit 22 receives a power-assist command as the operation command 30, and then a predetermined number of semiconductor switching elements, connected in a series-parallel combination in a bridge configuration, operate as a buck-boost switching device. Power by an increase in the bus voltage is stored in the bus-voltage smoothing capacitor 24 for the inverter circuit 22 through the switching device 3. This bus-voltage smoothing capacitor 24 corresponds to a conventional power-assisting electric storage device.

As described above, according to the first embodiment, a part of bus-voltage smoothing capacitors within the multiaxial driving apparatus is usable as a power-assisting electric storage device for storing regenerative power. Therefore, it is unnecessary to additionally provide a power-assisting electric storage device, which has been required in order to obtain a power-assist function. Accordingly, the multiaxial driving apparatus can be obtained, which is equipped with the power-assist function of achieving effective use of regenerative power easily at low cost without resulting in an increase in complexity and high cost.

Second Embodiment

Figure 2:
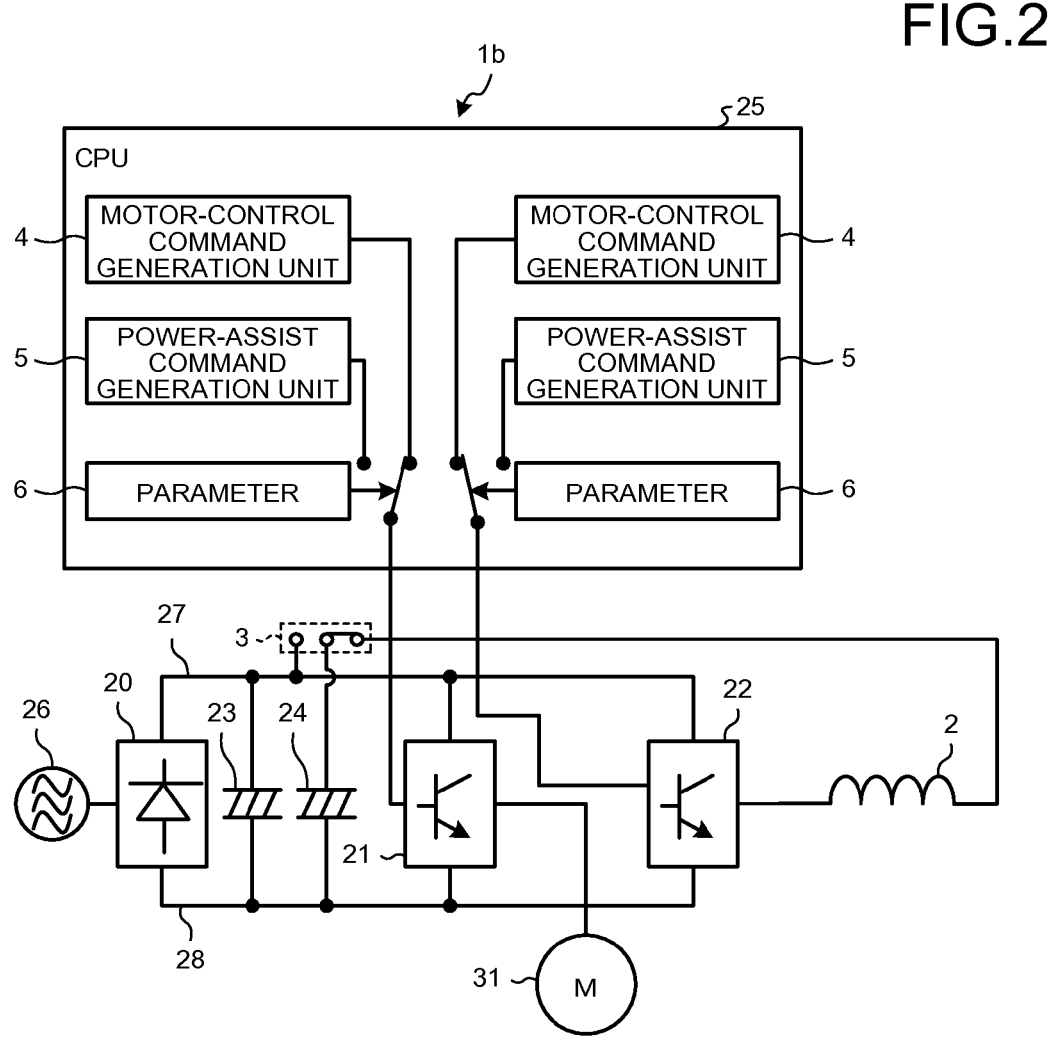
FIG. 2 is a block diagram illustrating a configuration of a multiaxial driving apparatus according to a second embodiment of the present invention.

FIG. 2 is a block diagram illustrating a configuration of a multiaxial driving apparatus according to a second embodiment of the present invention. In FIG. 2, constituent elements identical or equivalent to those illustrated in FIG. 1 (the first embodiment) are denoted by like reference signs. Parts relevant to the second embodiment will be mainly described below.

In FIG. 2, in a multiaxial driving apparatus 1b according to the second embodiment of the present invention, specific constituent elements of the control unit 25 are illustrated in the configuration illustrated in FIG. 1 (the first embodiment). Other configurations of the multiaxial driving apparatus 1b are identical to those of the multiaxial driving apparatus 1a illustrated in FIG. 1.

That is, in the control unit 25, a motor-control command generation unit 4, a power-assist command generation unit 5, and a parameter 6 are provided to each inverter circuit. In FIG. 2, because there are two inverter circuits, two sets of these constituent elements are illustrated.

The parameter 6 designates a motor-control mode or a power-assist mode by switching between these modes. When the parameter 6 designates the motor-control mode, the motor-control command generation unit 4 generates and outputs a motor-control command to a corresponding inverter circuit. When the parameter 6 designates the power-assist mode, the power-assist command generation unit 5 generates a power-assist command, taking into account the driving power in the other inverter circuit, and outputs the power-assist command to a corresponding inverter circuit.

In the configuration illustrated in FIG. 2, the motor 31 is connected to the output terminal of the inverter circuit 21, and the reactor 2 is connected to the output terminal of the inverter circuit 22. Therefore, in the control unit 25, the parameter 6 for the inverter circuit 21 designates the motor-control mode, and the parameter 6 for the inverter circuit 22 designates the power-assist mode.

Accordingly, in the control unit 25, the motor-control command generation unit 4 for the inverter circuit 21 generates and outputs a motor-control command to the corresponding inverter circuit 21, and also the power-assist command generation unit 5 for the inverter circuit 22 generates a power-assist command, taking into account the driving power in the other inverter circuit 21, and outputs the power-assist command to the corresponding inverter circuit 22.

Therefore, according to the second embodiment, in addition to performing operations similar to those of the first embodiment, a control unit configured by a single CPU generates all commands. Consequently, information of power to be supplied, or having been supplied, from the other inverter circuit to the motor can be shared, which is required to generate a power-assist command. Therefore, a communication unit that obtains information of power to be supplied, or having been supplied, from the other inverter circuit to the motor, and an external sensor that measures power are not needed. Accordingly, a multiaxial driving apparatus with a power-assist function can be constructed easily at low cost.

Third Embodiment

Figure 3:
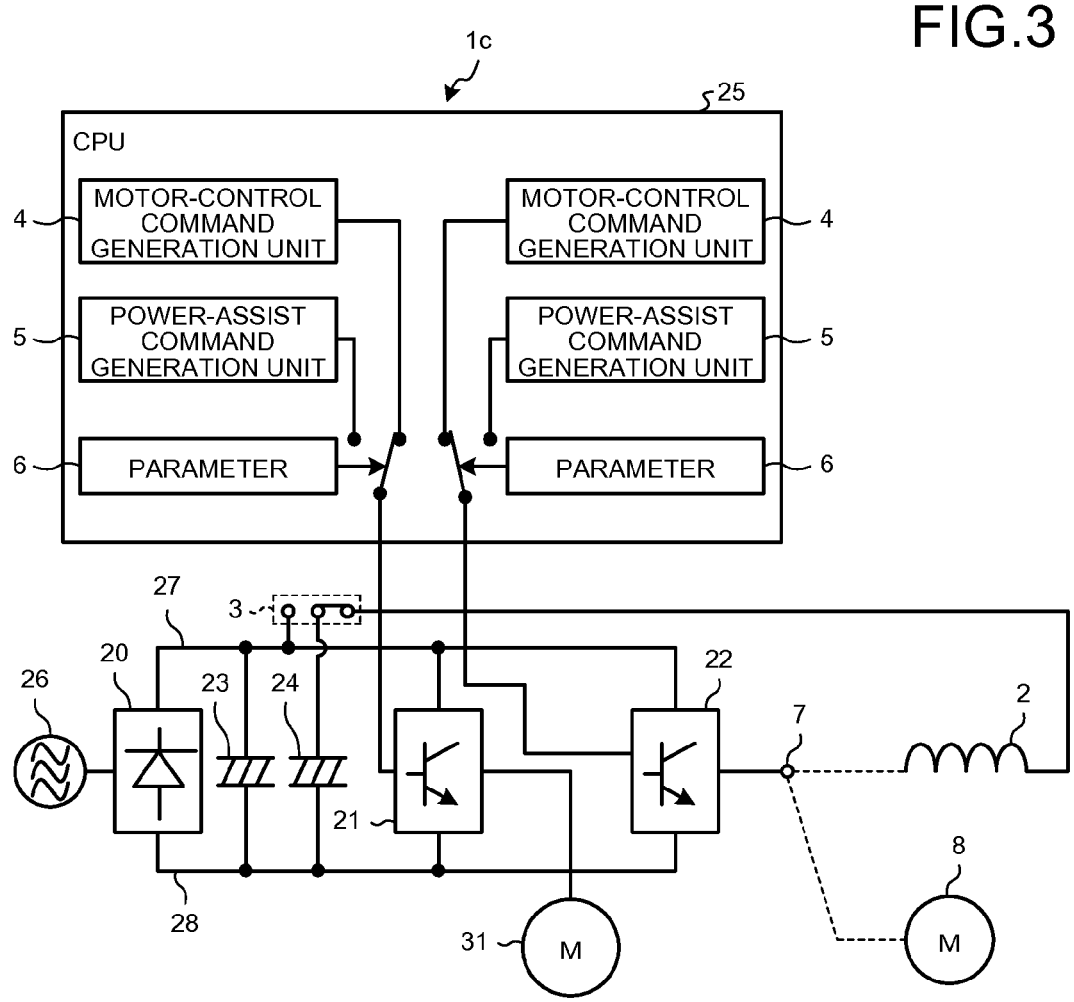
FIG. 3 is a block diagram illustrating a configuration of a multiaxial driving apparatus according to a third embodiment of the present invention.

FIG. 3 is a block diagram illustrating a configuration of a multiaxial driving apparatus according to a third embodiment of the present invention. In FIG. 3, constituent elements identical or equivalent to those illustrated in FIG. 2 (the second embodiment) are denoted by like reference signs. Parts relevant to the third embodiment will be mainly described below.

In FIG. 3, in a multiaxial driving apparatus 1c according to the third embodiment of the present invention, a motor 8 or one end of the reactor 2 is connected to the output terminal of the inverter circuit 22 by switching between them through a switching device 7 that does not rely on an electrical signal in the configuration illustrated in FIG. 2 (the second embodiment).

The switching device 7 that does not rely on an electrical signal is configured by a terminal block and a connector. The motor 8 or one end of the reactor 2 is connected to the switching device 7 by switching between them through manual work. Therefore, one of the motor 8 and one end of the reactor 2 is connected to the output terminal of the inverter circuit 22 by switching between them.

The control unit 25 is notified of information indicating which one of the reactor 2 and the motor 8 is connected to the output terminal of the inverter circuit 22.

Therefore, according to the third embodiment, in addition to performing operations similar to those of the second embodiment, the motor-control mode or the power-assist mode can be executed by switching between them without using a switching device that relies on an electrical signal. Therefore, a reduction in the number of maintenance parts, and downsizing of a multiaxial driving apparatus with a power-assist function can be achieved.

While an example of applying the third embodiment to the second embodiment has been described above, the third embodiment can be also applied to the first embodiment.

Fourth Embodiment

Figure 4:
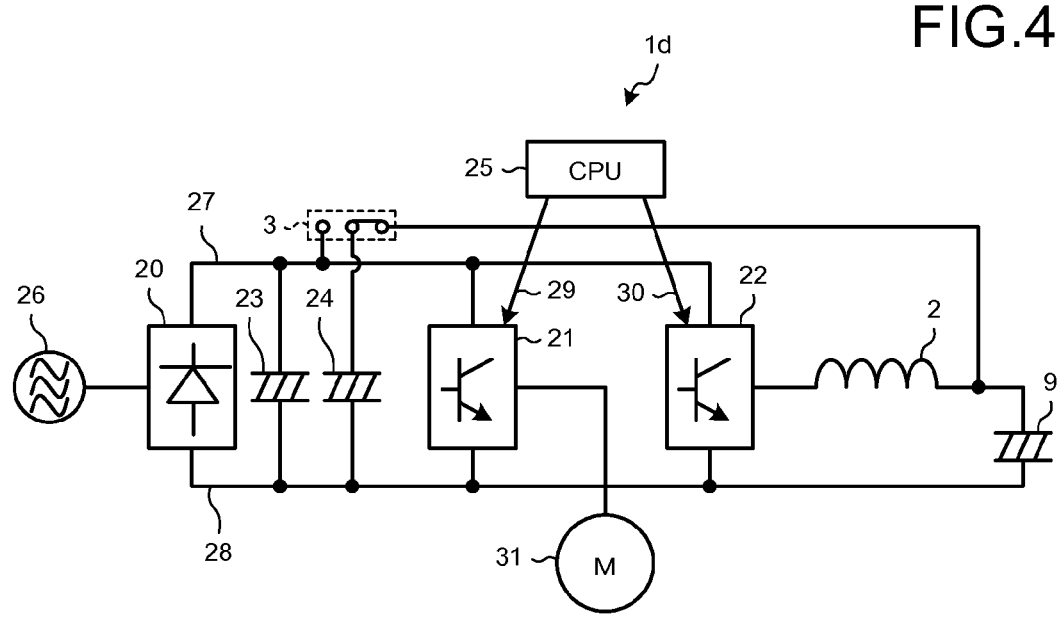
FIG. 4 is a block diagram illustrating a configuration of a multiaxial driving apparatus according to a fourth embodiment of the present invention.

FIG. 4 is a block diagram illustrating a configuration of a multiaxial driving apparatus according to a fourth embodiment of the present invention. In FIG. 4, constituent elements identical or equivalent to those illustrated in FIG. 1 (the first embodiment) are denoted by like reference signs. Parts relevant to the fourth embodiment will be mainly described below.

In FIG. 4, in a multiaxial driving apparatus 1d according to the fourth embodiment of the present invention, a power-assisting electric storage device 9 is added between the negative bus-bar 28 and the other end of the reactor 2 in the configuration illustrated in FIG. 1 (the first embodiment). As illustrated in FIG. 4, the power-assisting electric storage device 9 is added in such a manner as to be connected in parallel with the bus-voltage smoothing capacitor 24. Other configurations of the multiaxial driving apparatus 1d are identical to those illustrated in FIG. 1.

The power-assisting electric storage device 9 is provided for the purpose of covering the shortage of the assist amount when the assist amount only in the bus-voltage smoothing capacitor 24 that is a power-assisting electric storage device is insufficient. Therefore, where the electric storage capacitance required for power assist is represented as Cn, and the electric storage capacitance of the bus-voltage smoothing capacitor 24 (the electric storage capacitance assigned to power assist using the switching device 3) is represented as Ca, the capacitance C0 of an external power-assisting electric storage device 9 is expressed as "C0=Cn−Ca".

Therefore, according to the fourth embodiment, the capacitance of an external power-assisting electric storage device can be reduced as compared to conventional examples.

While an example of applying the fourth embodiment to the first embodiment has been described above, the fourth embodiment can be also applied to the second and third embodiments.

Fifth Embodiment

Figure 5:
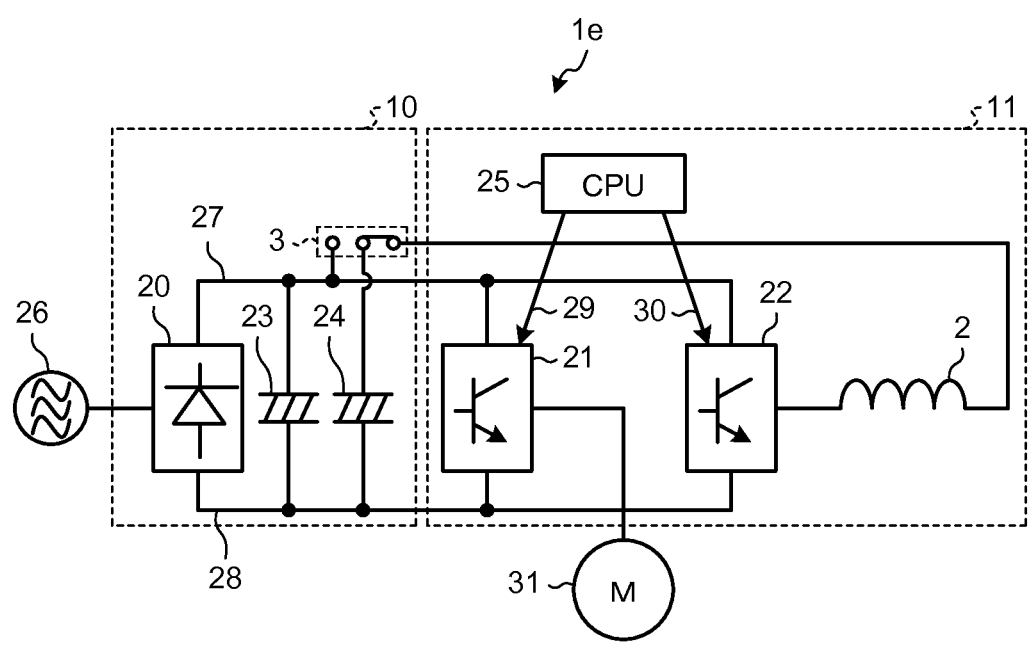
FIG. 5 is a block diagram illustrating a configuration of a multiaxial driving apparatus according to a fifth embodiment of the present invention.

FIG. 5 is a block diagram illustrating a configuration of a multiaxial driving apparatus according to a fifth embodiment of the present invention. In FIG. 5, constituent elements identical or equivalent to those illustrated in FIG. 1 (the first embodiment) are denoted by like reference signs. Parts relevant to the fifth embodiment will be mainly described below.

In FIG. 5, a multiaxial driving apparatus 1e according to the fifth embodiment is a converter-separation type, in which the multiaxial driving apparatus 1a illustrated in FIG. 1 (the first embodiment) has a converter unit 10 and a motor driving unit 11 accommodated in different casings from each other.

The converter unit 10 is configured by the converter circuit 20, the bus-voltage smoothing capacitors 23 and 24, and the switching device 3. The motor driving unit 11 is configured by the inverter circuits 21 and 22, the control unit 25, and the reactor 2.

The fifth embodiment of the present invention has described an example of application to the multiaxial driving apparatus 1a described in the first embodiment. However, the multiaxial driving apparatuses 1b to 1d described respectively in the second to fourth embodiments can be also configured as the converter-separation type. Even from this converter-separation type, effects identical to those in the first to fourth embodiments can be obtained.

Sixth Embodiment

A sixth embodiment of the present invention describes two modifications.

(1) In the first to fifth embodiments, within the multiaxial driving apparatus, N (N is an integer) bus-voltage smoothing capacitors may be connected in parallel to each inverter circuit.

According to this configuration, to each inverter circuit, the N bus-voltage smoothing capacitors may be divided into those for motor driving and those for power assist to switch therebetween by using a switching device that does not rely on an electrical signal. This can minimize the capacitance of the bus-voltage smoothing capacitors as required. Therefore, a surplus portion of the bus-voltage smoothing capacitors within the multiaxial driving apparatus is used as a power-assisting electric storage device, and accordingly the bus-voltage smoothing capacitors can be efficiently switched between their usages.

(2) Because the control unit 25 is configured by a single CPU, a power-assist command and a motor-control command can be generated in synchronization with each other based on the same calculation cycle. With this operation, the power-assist command can be generated with the same timing as the motor-control command. Therefore, it is possible to control the power-assist amount more appropriately than generating the power-assist command in a cycle that is not synchronized with the motor-control command.

INDUSTRIAL APPLICABILITY

As described above, the multiaxial driving apparatus according to the present invention is useful as a multiaxial driving apparatus that is equipped with a power-assist function of achieving effective use of regenerative power easily at low cost without resulting in an increase in complexity and high cost. The multiaxial driving apparatus according to the present invention is particularly suitable as a multiaxial driving apparatus that drives a mechanical device that requires high instantaneous torque, such as an injection molding machine.

REFERENCE SIGNS LIST 1a, 1b, 1c, 1d, 1e multiaxial driving apparatus, 2 reactor, 3 switching device, 4 motor-control command generation unit, 5 power-assist command generation unit, 6 parameter, 7 switching device, 8 motor, 9 power-assisting electric storage device, 10 converter unit, 11 motor driving unit, 20 converter circuit, 21, 22 inverter circuit, 23, 24 bus-voltage smoothing capacitor, 25 control unit (CPU), 26 commercial AC power supply, 27 positive bus-bar, 28 negative bus-bar, 31 motor.

The invention claimed is:
1. A driving apparatus comprising:
a converter circuit that converts an AC power supply to a DC power supply;
a plurality of inverter circuits that are provided in parallel between positive and negative bus-bars that are connected respectively to positive and negative output terminals of the converter circuit, where each of the inverter circuits is configured by connecting a plurality of semiconductor switching elements in a series-parallel combination in a bridge configuration;
a plurality of bus-voltage smoothing capacitors that are provided in parallel between the positive and negative bus-bars; and
a control unit that controls an operation of the inverter circuits individually under a program control, the driving apparatus being capable of driving a motor by connecting the motor to an output terminal of each of the inverter circuits, wherein
a reactor, and a switching device that does not rely on an electrical signal are provided, where one end of the reactor is connected to an output terminal of an inverter circuit, to which a motor is not connected, among the inverter circuits, and the other end of the reactor is connected to the switching device,
a positive terminal of the bus-voltage smoothing capacitor for an inverter circuit, to which the reactor is connected, is disconnected from the positive bus-bar, and is connected to a switching base terminal in the switching device, one switching terminal in the switching device is connected to the other end of the reactor, and the other switching terminal in the switching device is connected to the positive bus-bar, and in the switching device, when the switching base terminal and the one switching terminal are connected through a conductor, and the switching base terminal and the other switching terminal are not connected, the inverter circuits, to which the motor is connected, receive a motor-control command from the control unit, and then uses the semiconductor-switching elements connected in a series-parallel combination in a bridge configuration to generate AC power with an arbitrary frequency and voltage, to be supplied to the motor, from a bus voltage generated by the corresponding bus-voltage smoothing capacitors whose positive terminal is connected to the positive bus-bar, and an inverter circuit, to which the reactor is connected, receives a power-assist command from the control unit, and then the semiconductor switching elements connected in a series-parallel combination in a bridge configuration operate as a buck-boost switching device to store power by an increase in the bus voltage in a bus-voltage smoothing capacitor for the corresponding inverter circuit, where the bus-voltage smoothing capacitor is connected at its positive terminal to the switching base terminal in the switching device.

2. The driving apparatus according to claim 1, wherein the control unit includes, for each of the inverter circuits, a parameter that switches between a motor-control mode and a power-assist mode, a motor-control command generation unit that generates the motor-control command when the parameter designates a motor-control mode, and a power-assist command generation unit that generates the power-assist command, taking into account driving power in other inverter circuits when the parameter designates a power-assist mode.

3. The driving apparatus according to claim 1, wherein a motor or one end of the reactor is electrically and switchably connected to an output terminal of the inverter circuit, to which the reactor is connected, by switching between the motor and the one end of the reactor through a different switching device that does not rely on an electrical signal, and the control unit outputs a motor-control command to the inverter circuit, to which the reactor is connected, when the motor is electrically connected thereto, and outputs a power-assist command to the one inverter circuit when the reactor is electrically connected thereto.

4. The driving apparatus according to claim 1, wherein the control unit generates the motor-control command and the power-assist command in synchronization with each other based on a same calculation cycle.

5. The driving apparatus according to claim 1, wherein each of the plurality of bus-voltage smoothing capacitors are configured by connecting N (N is an integer) bus-voltage smoothing capacitors in parallel.

* * * * *